(12) United States Patent
Griffing (10) Patent No.: US 10,942,289 B2
(45) Date of Patent: Mar. 9, 2021

(54) LOGGING TOOL FERRITES AND METHODS OF MANUFACTURE

(71) Applicant: Halliburton Energy Services, Inc., Houston, TX (US)

(72) Inventor: Matthew Chase Griffing, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 104 days.

(21) Appl. No.: 16/250,005

(22) Filed: Jan. 17, 2019

(65) Prior Publication Data

US 2019/0170892 A1     Jun. 6, 2019

Related U.S. Application Data

(62) Division of application No. 15/129,580, filed as application No. PCT/US2015/056436 on Oct. 20, 2015, now Pat. No. 10,222,503.

(51) Int. Cl.
| | |
|---|---|
| *G01V 3/28* | (2006.01) |
| *H01F 1/37* | (2006.01) |
| *H01F 41/02* | (2006.01) |
| *G01V 13/00* | (2006.01) |
| *H01F 1/34* | (2006.01) |

(Continued)

(52) U.S. Cl.
CPC .............. *G01V 3/28* (2013.01); *G01V 13/00* (2013.01); *H01F 1/34* (2013.01); *H01F 1/37* (2013.01); *H01F 27/28* (2013.01); *H01F 27/325* (2013.01); *H01F 41/02* (2013.01); *H01F 41/0246* (2013.01)

(58) Field of Classification Search
CPC .............. G01V 3/18; G01V 3/26; G01V 3/28
See application file for complete search history.

(56) References Cited

U.S. PATENT DOCUMENTS

| 4,440,713 A | 4/1984 | Rigby | |
|---|---|---|---|
| 5,309,098 A * | 5/1994 | Coates | ..................... G01V 3/32 324/303 |

(Continued)

FOREIGN PATENT DOCUMENTS

| WO | 2016/076872 A1 | 5/2016 |
|---|---|---|
| WO | 2016/209273 | 12/2016 |

OTHER PUBLICATIONS

Extended European Search Report for Application No. 15906822.0 dated Jul. 17, 2018.

(Continued)

*Primary Examiner* — Tung X Nguyen
(74) *Attorney, Agent, or Firm* — Benjamin Ford; C. Tumey Law Group PLLC (57) ABSTRACT

A method of fabricating a ferrite for use in a resistivity logging tool includes mixing a ferrite powder with a binder to provide a mixture, and pressing the mixture into a mold to form the ferrite. The mold exhibits a specific geometry corresponding to a channel defined on an inner surface of a bobbin associated with the resistivity logging tool, and the channel is arcuate and extends at an angle offset from a central axis of the bobbin. At least one of a length, a width, and a thickness of the ferrite is then adjusted to manipulate a magnetic permeability of the ferrite in a direction of a magnetic field passing through the ferrite.

20 Claims, 7 Drawing Sheets

(51) Int. Cl.
*H01F 27/28* (2006.01)
*H01F 27/32* (2006.01)

(56) References Cited

U.S. PATENT DOCUMENTS

| | | | |
|---|---|---|---|
| 7,879,269 B1 | 2/2011 | Dening et al. | |
| 9,605,535 B2* | 3/2017 | Logan | E21B 7/04 |
| 2003/0229450 A1 | 12/2003 | Strickland | |
| 2005/0189945 A1 | 9/2005 | Reiderman | |
| 2009/0072825 A1 | 3/2009 | Prammer et al. | |
| 2014/0292340 A1 | 10/2014 | Yang | |
| 2017/0315263 A1* | 11/2017 | Griffing | G01V 13/00 |

OTHER PUBLICATIONS

ISR/WO for PCT/US2015/056436 dated Jul. 13, 2016.
Coillot et al., Induction Magnetometers Principle, Modeling and Ways of Improvement (2012).
Coillot et alk., Improvements on the Design of Search Coil Magnetometer for Space Experiments (2007).

* cited by examiner

LOGGING TOOL FERRITES AND METHODS OF MANUFACTURE

BACKGROUND

During drilling operations for the extraction of hydrocarbons, a variety of recording and transmission techniques are used to provide or record real-time data from the vicinity of a drill bit. Measurements of the surrounding subterranean formations may be made throughout drilling operations using downhole measurement and logging tools, such as measurement-while-drilling (MWD) and/or logging-while-drilling (LWD) tools, which help characterize the formations and aide in making operational decisions. Wellbore logging tools make measurements that may be used to determine the electrical resistivity (or its inverse conductivity) of the formations being penetrated, where the electrical resistivity indicates various features of the formations. Those measurements may be taken using one or more antennas coupled to the wellbore logging tools.

Logging tool antennas are often formed by positioning coil windings about an axial section of the logging tool, such as a drill collar. Ferrite materials or "ferrites" (or magnetic materials in general) are sometimes positioned beneath the coil windings to increase the efficiency and/or sensitivity of the antenna. The ferrites facilitate a higher magnetic permeability path (i.e., a flux conduit) for the magnetic field generated by the coil windings, and help shield the coil windings from the drill collar and associated losses (e.g., eddy currents generated on the drill collar). Since the ferrites have the capability of shaping and manipulating the generated magnetic field, great care must be taken when designing the ferrite geometry to prevent undesired effects. Due to the increased use of tilted or directional coil windings, however, the shape of the ferrites has become quite complex, and very difficult and/or cumbersome to machine.

As a result, ferrites are more recently being molded and/or pressed into desired geometric shapes and configurations. Briefly, molding ferrites includes mixing a powder iron/ferrite material with a binder, such as a silicone-based rubber, an elastomer, an RTV, a polymer (such as polyimide), a ceramic, or an epoxy. The mixture is then pressed into a mold, where it conforms to the intricate geometry of the mold. This molding process, however, can result in non-homogenous ferrites or ferrites that exhibit a large variance in relative permeability (i.e., non-homogeneity) even when molded from the same mixture. Such non-homogeneity and variance in permeability may adversely affect field roundness and/or symmetry, which is critical for logging tools.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to wellbore logging tools and, more particularly, to controlling and/or compensating for varying permeability of molded ferrites by manipulating the geometry and structure of the molded ferrites.

Embodiments described herein exploit the use of a high length-to-width aspect ratio for a ferrite to enhance the magnetic field in the long (length) dimension and thereby ensure that the effective permeability of the short (width) dimension remains low compared to the long dimension. Embodiments described herein also use non-magnetic dividers between laterally adjacent ferrites to prevent contact of the adjacent ferrites and thereby prevent a continuous magnetic path therebetween. The present disclosure provides practical ways to control and otherwise compensate for the variation in homogeneity of molded ferrites through manipulation of their geometries (e.g., aspect ratios) and through air-gapping or laminations.

Figures 1, 2:
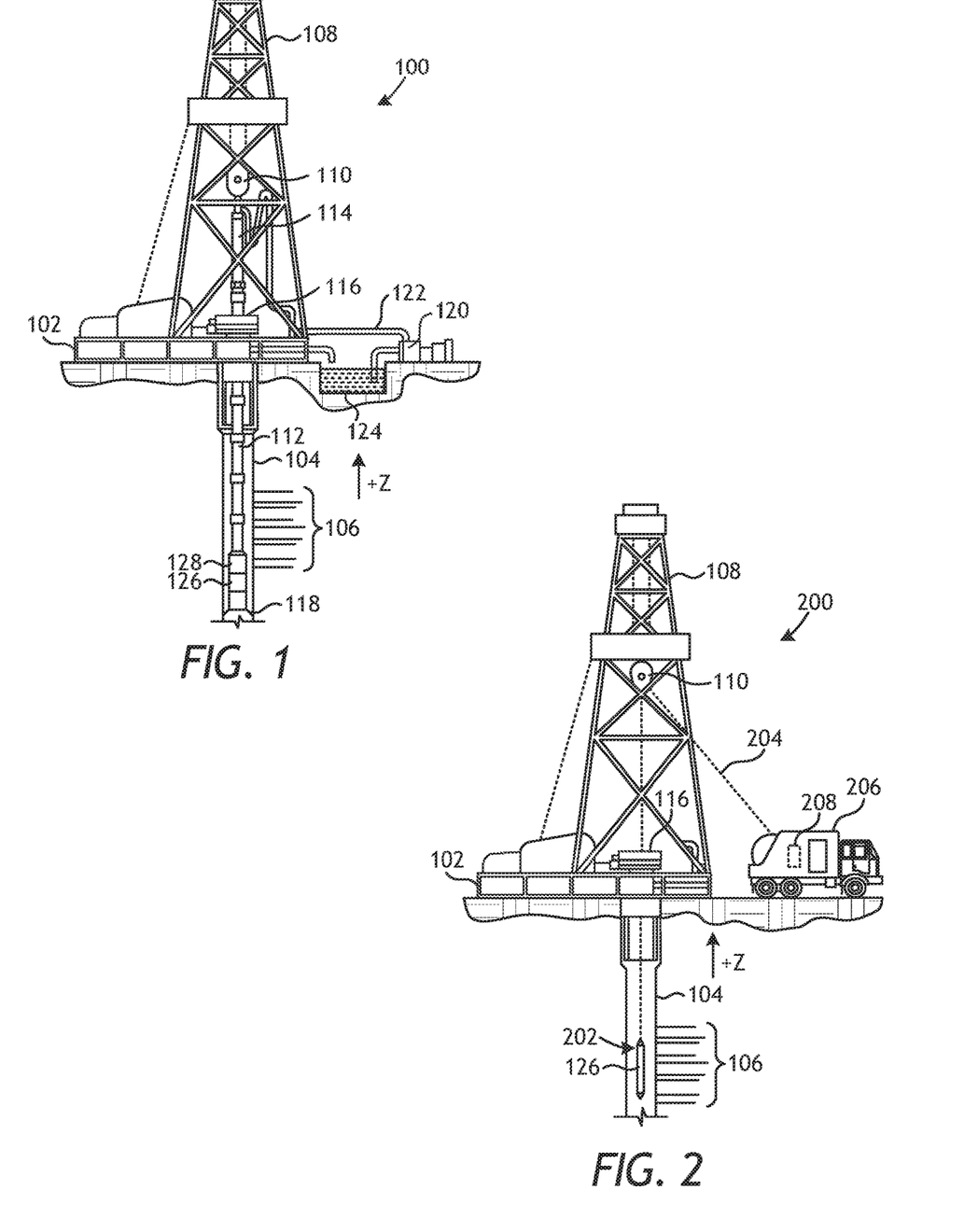
FIG. 1 is a schematic diagram of an exemplary drilling system that may employ the principles of the present disclosure.
FIG. 2 is a schematic diagram of an exemplary wireline system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one resistivity logging tool 126, which may comprise a plurality of antennae capable of receiving and/or transmitting one or more electromagnetic (EM) signals that are axially spaced along the length of the logging tool 126. As will be described in detail below, the resistivity logging tool 126 may further comprise a plurality of ferrites used to enhance and/or shield the EM signals and thereby increase the azimuthal sensitivity of the logging tool 126.

As the drill bit 118 extends the wellbore 104 through the formations 106, the resistivity logging tool 126 may collect azimuthally-sensitive measurements relating to the resistivity of the formations 106, i.e., how strongly the formations 106 opposes a flow of electric current. The logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the resistivity logging tool 126 may also be stored within the logging tool 126 or the telemetry module 128 for later retrieval at the surface upon retracting the drill string 112.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again in detail. As illustrated, the wireline system 200 may include a wireline instrument sonde 202 that may be suspended into the wellbore 104 by a cable 204. The wireline instrument sonde 202 may include the resistivity logging tool 126, which may be communicably coupled to the cable 204. The cable 204 may include conductors for transporting power to the wireline instrument sonde 202 and also facilitate communication between the surface and the wireline instrument sonde 202. A logging facility 206, shown in FIG. 2 as a truck, may collect measurements from the resistivity logging tool 126, and may include computing facilities 208 for controlling, processing, storing, and/or visualizing the measurements gathered by the resistivity logging tool 126. The computing facilities 208 may be communicably coupled to the logging/measurement tool 126 by way of the cable 204.

Figure 3A:
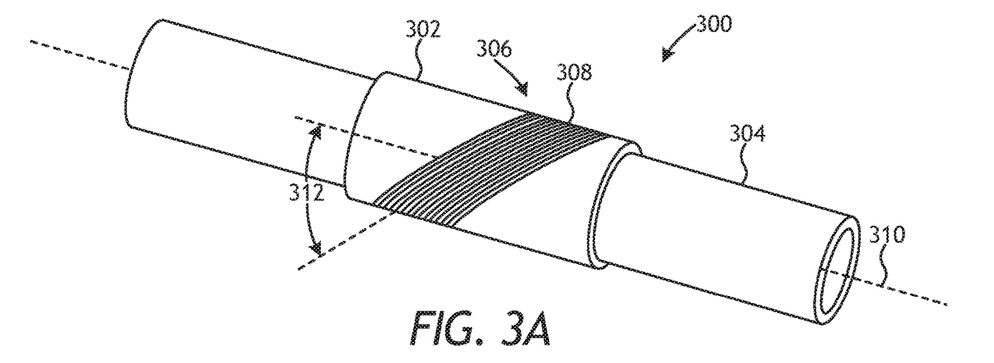
FIGS. 3A and 3B are partial views of an exemplary resistivity logging tool.
Figure 3B:
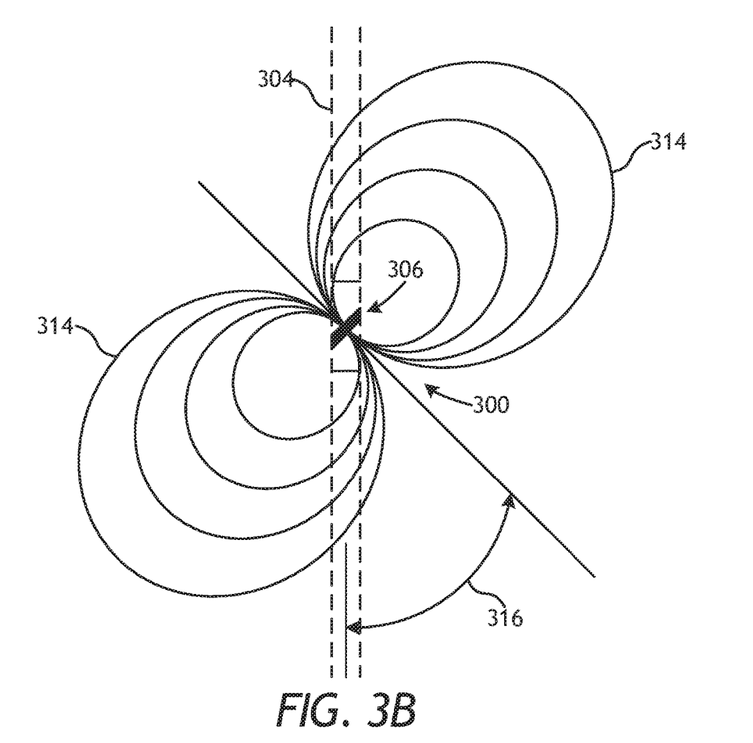

Referring now to FIGS. 3A and 3B, illustrated are partial views of an exemplary resistivity logging tool 300, according to one or more embodiments. The logging tool 300 may be the same as or similar to the resistivity logging tool 126 of FIGS. 1 and 2 and, therefore, may be used in the drilling or wireline systems 100, 200. In FIG. 3A, the resistivity logging tool 300 is depicted as including a bobbin 302 positioned about a tool mandrel 304, such as a drill collar. The bobbin 302 may be formed of a high temperature plastic, thermoplastic, polymer (e.g., polyimide), a ceramic, or an epoxy material, but could alternatively be made of a variety of other non-magnetic, electrically insulating/non-conductive materials. The bobbin 302 can be fabricated, for example, by additive manufacturing (i.e., 3D printing), injection molding, machining, or other known processes.

The resistivity logging tool 300 may further include an antenna 306, which may comprise a coil winding 308 wrapped about the bobbin 302 and extending axially along at least a portion thereof. The coil winding 308 can form any number of turns or windings about the bobbin 302 and may be positioned within corresponding grooves (not labeled) defined in the outer surface of the bobbin 302. The coil winding 308 can be concentric or eccentric relative to a central axis 310 of the tool mandrel 304.

As illustrated, the coil winding 308 is positioned about the bobbin 302 at an angle 312 offset from the central axis 310. As a result, the antenna 306 may be characterized as a "tilted coil" or "directional" antenna. In the illustrated embodiment, the angle 312 is 45°, but could alternatively be any angle offset from the central axis 310. As best seen in FIG. 3B, when current is passed through the coil winding 308 of the antenna 306, a dipole magnetic field 314 may be generated that extends radially outward from the antenna 306 orthogonal to the winding direction. As a result, the tilted antenna 306 may exhibit a magnetic field angle 316 with respect to the tool mandrel 304. Since the angle 312 is 45°, the magnetic field angle 316 may also be 45°. As will be appreciated, however, the magnetic field angle 316 may be altered by adjusting or manipulating the angle 312.

Figure 4A:
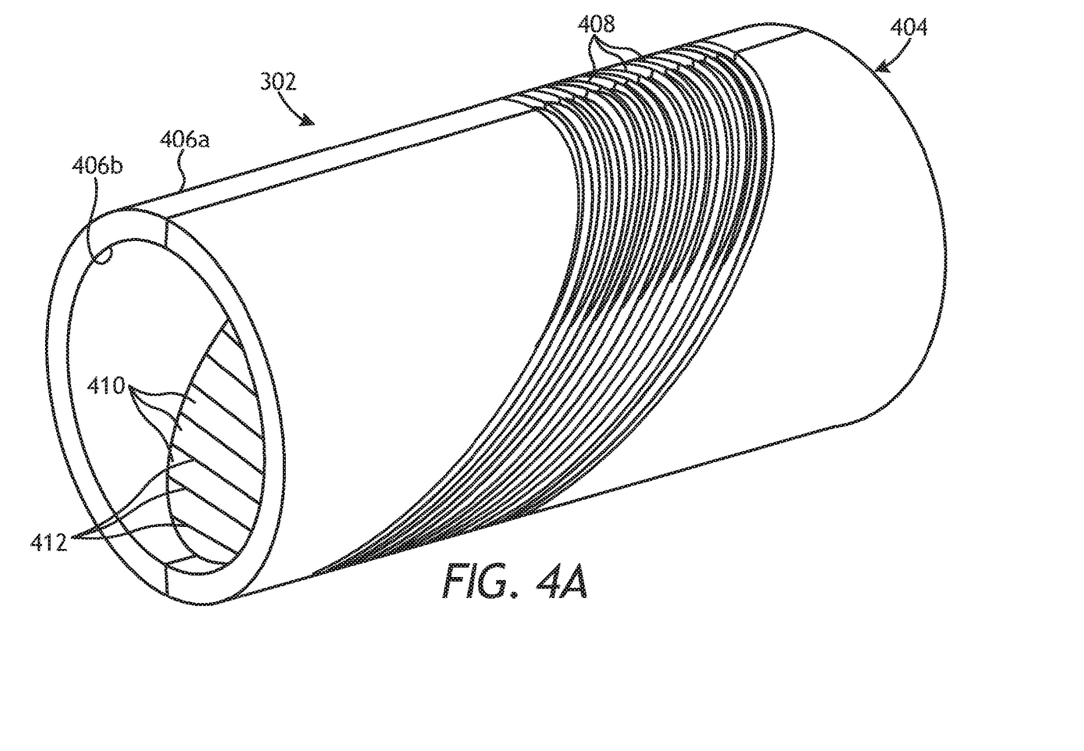
FIGS. 4A and 4B depict an enlarged isometric view of the bobbin of FIG. 3A and a plurality of ferrites.
Figure 4B:
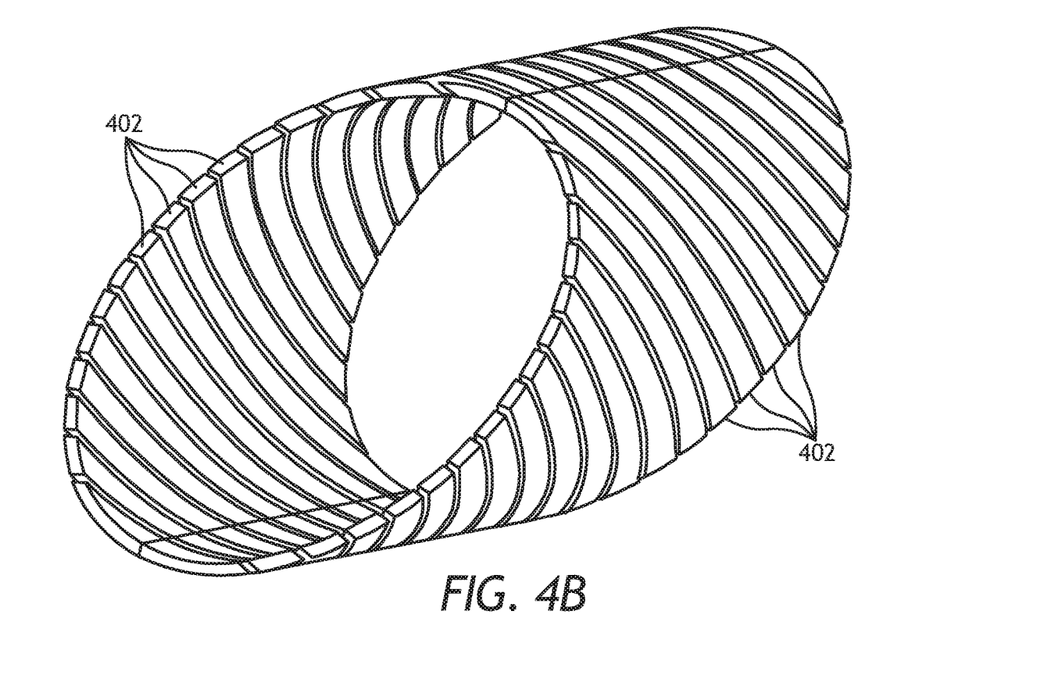

Referring now to FIGS. 4A and 4B, with continued reference to FIGS. 3A and 3B, illustrated are enlarged isometric views of the bobbin 302 and a plurality of ferrites 402, respectively, according to one or more embodiments. As depicted in FIG. 4A, the bobbin 302 may comprise a generally cylindrical body 404. In some embodiments, as illustrated, the body 404 may be made up of two or more arcuate sections or members. In other embodiments, however, the body 404 may comprise a monolithic structure.

The body 404 may provide an outer surface 406a and an inner surface 406b. As illustrated, a plurality of grooves 408 may be defined on the outer surface of the body 404, and a plurality of channels 410 may be defined on the inner surface 406b of the body 404. The grooves 408 may be configured to receive the coil winding 308 (FIG. 3A) to provide the antenna 306 (FIGS. 3A and 3B), and the channels 410 may be configured to receive the ferrites 402 shown in FIG. 4B. Accordingly, the ferrites 402 may be positioned to interpose the coil winding 308 and the underlying tool mandrel 304 (FIG. 3A) and shield the coil winding 308 from eddy currents generated by the tool mandrel 304, thereby increasing the azimuthal sensitivity of the logging tool 300 (FIGS. 3A-3B) and/or increasing the efficiency/field strength of the antenna. Moreover, the channels 410 may be defined in the body 404 generally orthogonal to the grooves 408; i.e., at an angle rotated 90° from the angle 312 (FIG. 3A) offset from the central axis 310 (FIG. 3A). Accordingly, the ferrites 402 may be characterized as "tilted" ferrites as they are required to be tilted about the curvature of the body 404.

In some embodiments, each channel 410 may be configured to receive a single ferrite 402. In other embodiments, however, each channel 410 may be configured to receive two or more ferrites 402 arranged end-to-end.

In some embodiments, as illustrated, each channel 410 may be separated by a ridge or divider 412 defined on the inner surface 406b of the body 404 and extending radially inward. When the ferrites 402 are received within the channels 410, the dividers 412 may serve to prevent physical contact between laterally adjacent ferrites 402, and thereby prevent a continuous magnetic path between the adjacent ferrites 402. As part of the bobbin 302, the dividers 412 may also be made of a high temperature plastic, thermoplastic, polymer (i.e., polyimide), a ceramic, or an epoxy material, which exhibits a relative permeability ($\mu_r$) of approximately 1, which is equivalent to the permeability of free space or air ($\mu_o$). Accordingly, the dividers 412 may be considered substantially equivalent to providing air gaps between the adjacent ferrites 402, often called "air-gapping," which essentially serves as a non-magnetic insulator between the adjacent ferrites 402. The length-to-width aspect ratio of each ferrite 402 may be orthogonal to the coil winding 308, and the dividers 412 may prove advantageous in ensuring that the effective permeability of each ferrite 402 along its width remains low as compared to its length.

As can be seen, each "tilted" ferrite 402 is required to exhibit a complex geometry having a unique cross-section that can be twisted and arched to conform to the curvature of the channels 410 and the inner surface 406b of the body 404. As a result, it is quite difficult to accurately machine the ferrites 402. Instead, as mentioned above, the ferrites 402 are often molded to conform to the required intricate geometries of each channel 410. More particularly, a ferrite powder can be mixed with a binder, such as an uncured rubber or elastomer (e.g., a silicone-based rubber or elastomer), a ceramic a polymer and/or an epoxy, and the mixture may then be rolled between a pair of rollers in an attempt to obtain a homogeneous mixture pressed to a desired thickness. The ferrite 402 may then be inserted and otherwise pressed into a mold that conforms to the intricate geometry of a corresponding channel 410 of the bobbin 302. As a result, each ferrite 402 may be molded to the specific geometry of its corresponding channel 410.

Figure 5:
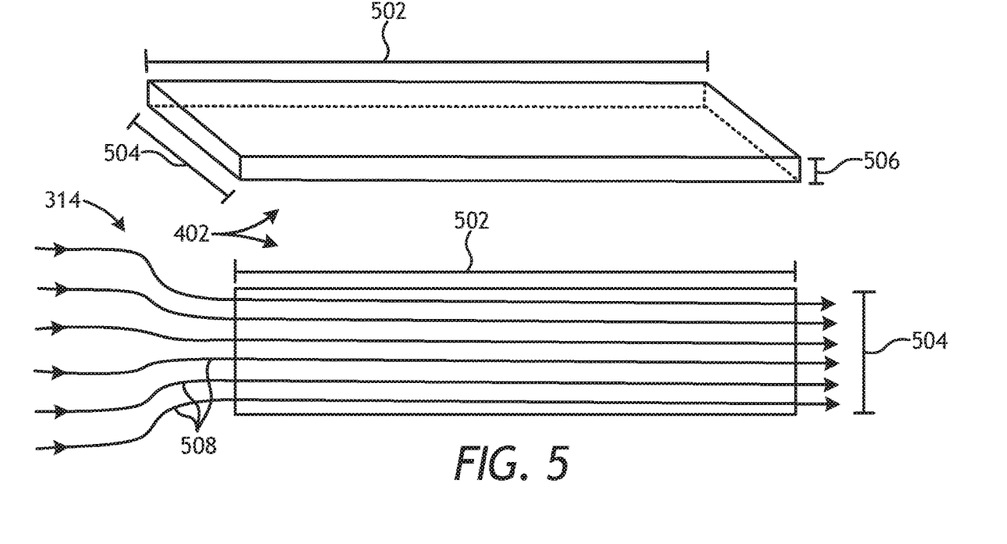
FIG. 5 depicts isometric and top views of an exemplary ferrite.

Referring to FIG. 5, with continued reference to FIGS. 4A-4B, illustrated are isometric and top views of an exemplary ferrite 402, flattened for illustrative purposes. As illustrated, the ferrite 402 is a generally rectangular structure that exhibits a length 502, a width 504, and a thickness 506. As shown in the top view of FIG. 5, the ferrite 402 may exhibit a generally homogeneous and/or isotropic permeability. As a result, the magnetic flux lines 508 of the magnetic field 314 may proceed through the ferrite 402 in a direction aligned with and otherwise parallel to the length 502. Since the permeability of the ferrite 402 is generally homogenous, the ferrite 402 may serve to enhance the magnetic field 314, without substantially affecting its intended direction or distribution.

In practice, however, the ferrites 402 may not all exhibit a homogeneous and/or isotropic permeability but may instead exhibit varying permeability that may adversely affect the direction of the magnetic field 314. As can be appreciated, varying permeability may result from the molding process used to fabricate the ferrites 402. For instance, the rollers used to mix the ferrite powder and the uncured rubber or elastomer may have to be continuously cooled due to frictional heating, which may cause the rubber or elastomer to start curing prematurely or otherwise require that the process pause intermittently to allow additional cooling time. Moreover, the sitting time between mixing and molding may also allow the ferrite powder in the mixture to settle, separate, or clump unevenly throughout the mixture, which may adversely affect resulting permeability.

Figure 6:
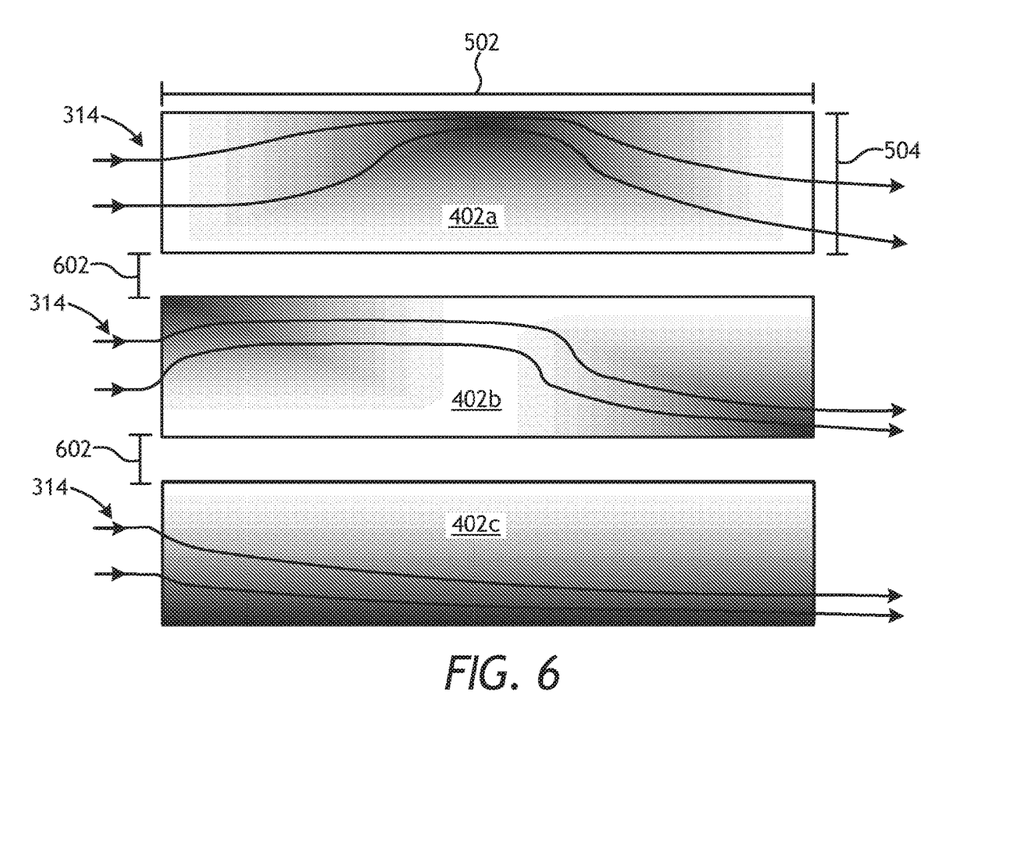
FIG. 6 depicts top views of three non-homogeneous molded ferrites.

FIG. 6 depicts top views of three non-homogeneous molded ferrites 402, shown as a first ferrite 402a, a second ferrite 402b, and a third ferrite 402c, each having its length 502 aligned with the direction of the magnetic field 314. The shading in each ferrite 402a-c corresponds to magnetic permeability, where the darker shading corresponds to higher magnetic permeability and the lighter shading corresponds to lower magnetic permeability. As illustrated, adjacent ferrites 402a-c may be separated by corresponding gaps 602, which may be provided by the dividers 412 (FIG. 4A) and therefore exhibit a very low permeability (i.e., approximately 1 or equivalent to being "air-gapped"). Since the magnetic flux lines of the magnetic field 314 will tend to move through paths of highest magnetic permeability, the gaps 602 may help maintain the magnetic flux lines within the ferrite 402 as they proceed along the direction of the length 502. The net effect of the non-homogeneous ferrites 402, however, may result in a change in the intended direction, distribution, and/or angle 316 (FIG. 3B) of the magnetic field 314.

According to embodiments of the present disclosure, the magnetic field 314 along the length 502 of each ferrite 402 may be enhanced or otherwise controlled by manipulating the geometry of each ferrite 402. This may be done either post-manufacture or during the design phase of a particular ferrite 402. As will be appreciated, this may serve to constrain the magnetic field 314 to smaller dimensions and thereby mitigate substantive changes in the direction and/or the angle 316 (FIG. 3B) of the magnetic field 314. In at least one embodiment, the aspect ratio between the length 502 and the width 504 of each ferrite 402 may be increased to minimize the net effect of the direction and/or the angle 316 of the magnetic field 314, even when using non-homogenous molded ferrites 402. More particularly, scaling down the width 504 of the molded ferrites 402 with respect to the length 502 (i.e., increasing the aspect ratio) may result in obtaining better control over the direction/distribution of the magnetic field 314.

Figure 7A:
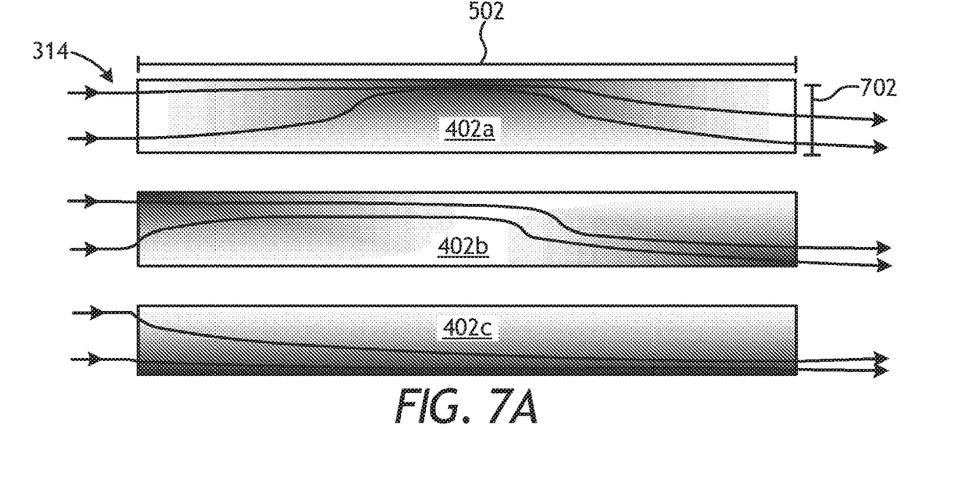
FIGS. 7A and 7B depict the three ferrites of FIG. 6 with a reduced width.
Figure 7B:
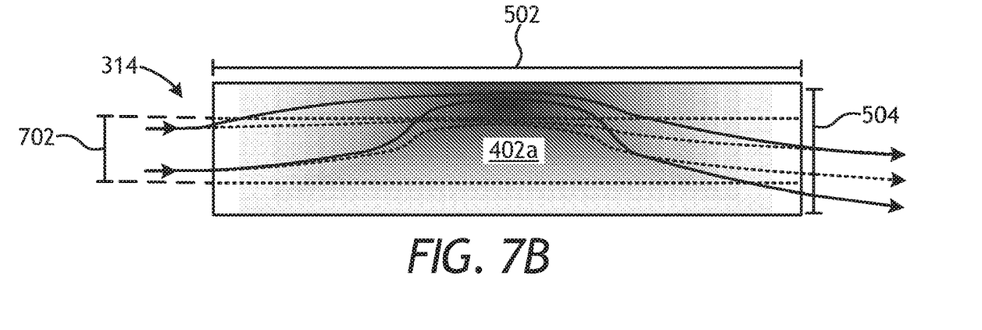

This can be seen in FIGS. 7A and 7B, which depict the ferrites 402a-c with a reduced width 702. More particularly, while maintaining the identical permeability distribution, the reduced width 702 of each ferrite 402a-c is about half of the initial width 504 (FIG. 7B). As can be seen, increasing the aspect ratio between the length 502 and the width 504 in each ferrite 402a-c improves the straightness of the magnetic flux lines of the magnetic field 314 passing through the non-homogenous ferrites 402a-c.

In the enlarged view of FIG. 7B, the first ferrite 402a is shown before and after the aspect ratio is increased. The solid magnetic flux lines are representative of the magnetic field 314 before the aspect ratio is increased, and therefore extend into the larger width 504. The dashed magnetic flux lines are representative of the magnetic field 314 after the aspect ratio is increased, and therefore extend only into the smaller or reduced width 702. As can be seen, the net effect on the direction of the magnetic field 314 is reduced (e.g., by approximately half).

This increase in length/width aspect ratio may also have the added benefit of decreasing the demagnetizing factor ($N_z$, which opposes/reduces the magnetic field 314) in the direction of the length 502 (z) direction, thus increasing the effective magnetic permeability of the ferrites 402a-c. Those skilled in the art will readily recognize that this is the same well defined/characterized effect that is seen in cylindrical rod or ellipsoidal ferrite cores, as shown in Equations (1), (2), and (3) below:

$$\mu_{eff} = \frac{\mu_r}{1 + N_z(\mu_r - 1)} \quad (1)$$

where $\mu_{eff}$ is effective permeability; $\mu_r$ is relative permeability of ferrite material; and $N_z$ is the demagnetizing factor. For cylindrical rod/ellipsoidal cores:

$$N_z = \frac{1}{m^2 - 1}\left(\frac{m}{\sqrt{m^2 - 1}}\ln\left(m + \sqrt{m^2 - 1}\right) - 1\right) \quad (2)$$

where m is length/diameter aspect ratio. And simplification for m>>1 yields:

$$N_z = \frac{1}{m^2}(\ln(2m) - 1) \quad (3)$$

Although the above expressions for the demagnetizing factor $N_z$ describe specifically the cylindrical rod/ellipsoidal core geometry, those skilled in the art will readily recognize that the general inverse relationship between length/diameter (or length/width) aspect ratio and $N_z$ is true for any geometry/core shape. In other words, longer/thinner core geometries will have lower $N_z$ and higher effective permeability.

Figure 8:
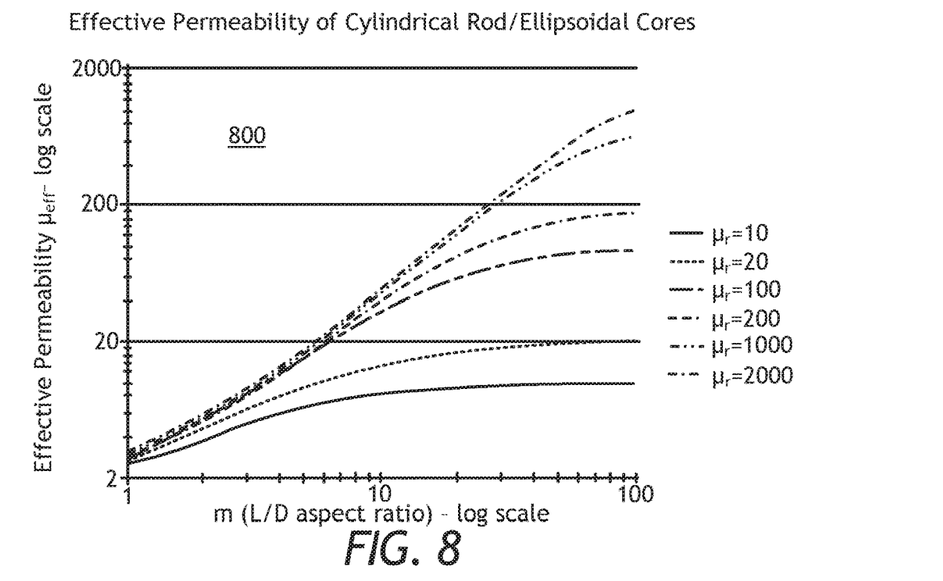
FIG. 8 depicts a plot that compares the effective permeability ($\mu_{\mathit{eff}}$) of rod/ellipsoidal ferrites with relative permeability ($\mu_r$).

It can be seen from Equation (1) that the variability in relative permeability between different ferrites may be attenuated by decreasing the length/diameter aspect ratio, due to the increase in the demagnetizing factor $N_z$. FIG. 8 depicts a plot 800 that compares the effective permeability ($\mu_{eff}$) of rod/ellipsoidal ferrites with relative permeability ($\mu_r$) of 10, 20, 100, 200, 1000, and 2000. As shown in the plot 800, as the aspect ratio is reduced, the difference in effective permeability decreases and the curves converge, particularly at higher relative permeability, which in general would be desirable for resistivity antennas (e.g., the antenna 306 of FIGS. 3A and 3B). Again, although the plot 800 employs the analytical expression for the demagnetizing factor $N_z$ of a cylindrical rod/ellipsoidal core to compute the effective permeability, the same relationship may be observed by reducing the length/width aspect ratio of the ferrites 402a-c.

Figure 9:
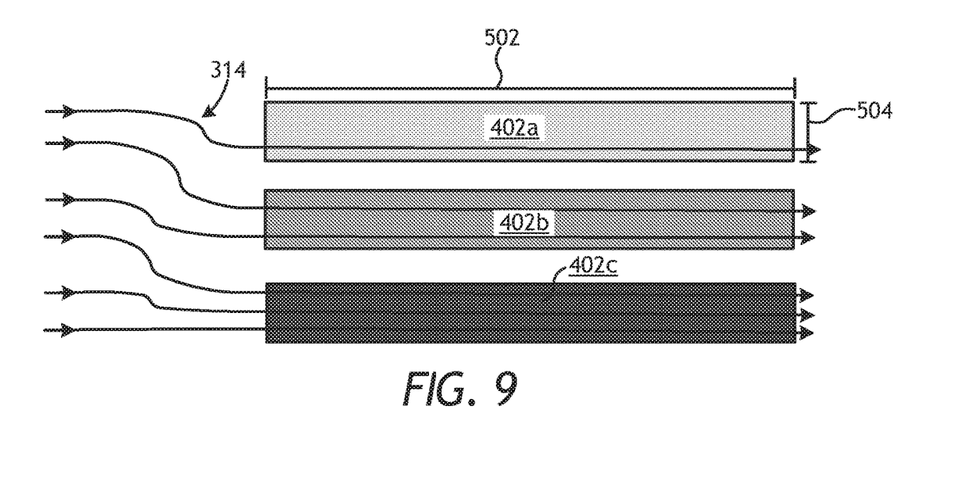
FIG. 9 depicts the ferrites of FIG. 6, where each ferrite exhibits a homogenous magnetic permeability, but the magnetic permeability is different.

In alternative embodiments, the aspect ratio between the length 502 and the width 504 in each ferrite 402a-c may be reduced such that the variation in effective permeability between adjacent ferrites 402a-c can be constrained and otherwise minimized to mitigate the impact on the direction/distribution of the magnetic field 314. For instance, FIG. 9 depicts the ferrites 402a-c, where each ferrite 402a-c exhibits a homogenous magnetic permeability, but the magnetic permeability of each ferrite 402a-c is different. As illustrated, the magnetic permeability of the third ferrite 402c is greater than the magnetic permeability of the second ferrite 402b, which is greater than the magnetic permeability of the first ferrite 402a. In such embodiments, the third ferrite 402c may tend to draw or pull more of the magnetic field 314 through its path. The result is a net change in concentration/distribution of the magnetic field 314 along the length 502.

At reduced aspect ratios, however, the effective permeability of the ferrites 402a-c with varying relative permeability converges. Accordingly, decreasing the length 502 and/or increasing the width 504 of each ferrite 402a-c (i.e., decreasing the length/width aspect ratio) may reduce the difference in effective magnetic permeability of adjacent ferrites 402a-c, which may minimize the adverse effects on the direction and/or distribution of the magnetic field 314. It is noted that this would result in a decrease in effective permeability and is, therefore, counter to the above-described method of controlling non-homogeneity of a ferrite 402a-c by increasing the length/width aspect ratio to ensure a straighter magnetic field 314 through the ferrite 402a-c. Therefore, a design tradeoff may have to be made, weighing the effects of both the variance in permeability among different ferrites 402a-c, and the non-homogeneity within an individual ferrite 402a-c, on the angle/distribution of the magnetic field 314.

Accordingly, manipulating the geometry of any of the ferrites 402 described herein, may entail adjusting any one of the length 502, the width 504, and the thickness 506 of the specific ferrite 402 to a desired aspect ratio, and thereby resulting in an optimized magnetic permeability of the ferrite 402 in the direction of the magnetic field passing therethrough. Manipulating the geometry of the ferrites 402 may be done either post-manufacture, during the design phase of the ferrites 402, or both. For instance, the geometry of a manufactured ferrite 402 may be manipulated by making fine or coarse adjustments to the body of the ferrite 402, such as by grinding, cutting, and/or machining specific portions of the ferrite 402. As will be appreciated this may allow a user to fine tune the magnetic field angle/direction and/or shape to a desired magnetic permeability. In such embodiments, the bobbin 302 (FIG. 3A) may or may not need to be adjusted to accommodate the new dimensions of the ferrite 402. In at least one scenario, small spacers or shims may be employed to hold the modified ferrite 402 in place and otherwise centralized within the corresponding channel 410.

In other embodiments, the geometry and aspect ratio of a particular ferrite 402 may be manipulated during the design phase of the particular ferrite 402. In such embodiments, one or more design iterations may take place to optimize the magnetic permeability. Moreover, in such embodiments, the dimensions of the bobbin 302 (FIG. 3A) may also be modified, if needed, to accommodate the new dimensions of the ferrite 402. In yet other embodiments, the geometry of the ferrites 402 may be done through a combination of both post-manufacturing adjustments and design phase adjustments.

Figure 10:
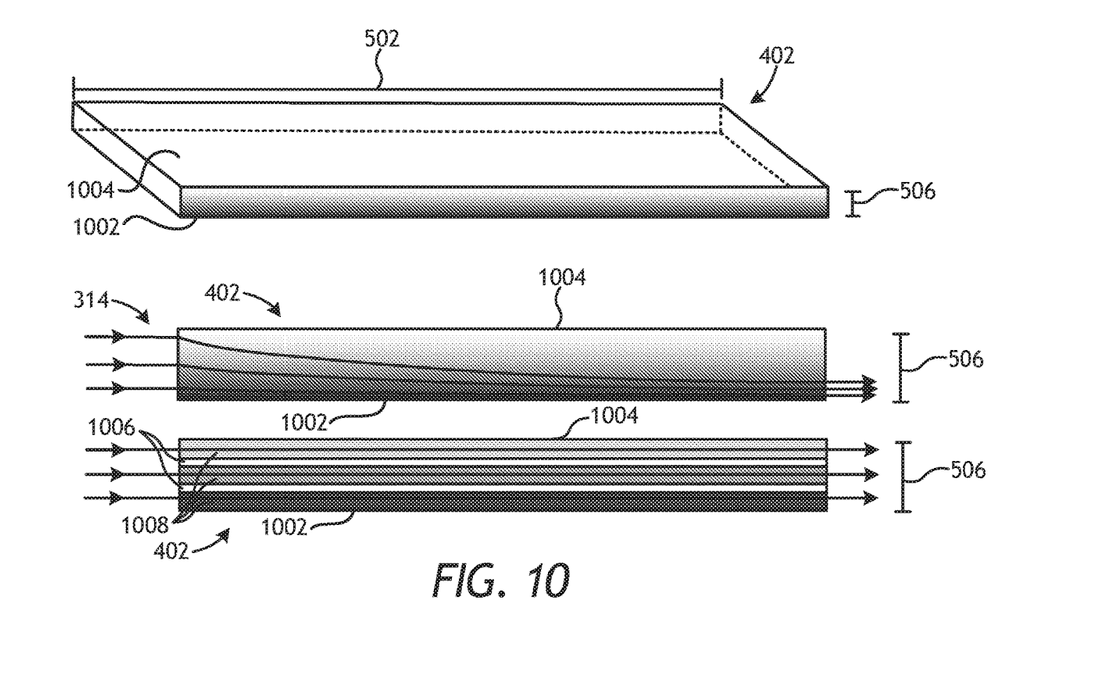
FIG. 10 depicts isometric and top views of another exemplary ferrite.

Referring now to FIG. 10, with continued reference to the prior figures, illustrated is another exemplary ferrite 402. According to one or more embodiments, the thickness 506 of the ferrite 402 may be manipulated to counter non-homogeneity and thereby help control the direction, distribution, and/or angle 316 (FIG. 3B) of the magnetic field 314. More specifically, in some cases, there may be a higher concentration of ferrite material at a particular depth or location across the thickness 506 of the ferrite 402. For instance, as illustrated, there may be a higher concentration of ferrite material at the bottom 1002 of the ferrite 402 as opposed to the top 1004. This may occur if the ferrite material of the molded ferrite 402 is allowed to settle before the rubber/elastomer cures. In such cases, the permeability at the bottom 1002 of the ferrite 402 will be greater than at the top 1004, and the magnetic flux lines of the magnetic field 314 will tend to merge toward the bottom 1002. This can be seen in the middle image of FIG. 10

To counter the non-homogeneity along the thickness 506, and thereby improve the direction of the magnetic field 314, one or more laminations 1006 may be positioned between adjacent layers 1008 of the ferrite 402, as shown in the lower image of FIG. 10. The laminations 1006 may be made of any non-magnetic, electrically insulating/non-conductive material such as, but not limited to, a polymer (e.g., polyimide), a rubber (e.g., RTV silicone), an elastomer, a ceramic, an epoxy, and any combination thereof.

The laminated ferrite 402 of FIG. 10 may be fabricated by molding or otherwise providing thin ferrite strips 1008 that are then stacked and/or laminated with one or more laminations 1006. The ferrite strips 1008 each exhibit a decreased thickness 506, which effectively reduces the dimension in which the magnetic field 314 can change direction along the length 502. Since the laminations 1006 are non-magnetic, the laminations 1006 may exhibit a relative permeability of approximately 1 and may otherwise be equivalent to air-gapping the ferrite 402 between the top 1004 and the bottom 1002 at one or more depths. As a result, the magnetic flux lines of the magnetic field 314 may proceed more uniformly along the length 502 of the ferrite 402 between the laminations 1006. Accordingly, the laminated ferrite 402 may be fabricated to the original thickness 506, but with improved control over non-homogeneity by incorporating the laminations 1006.

Figure 11A:
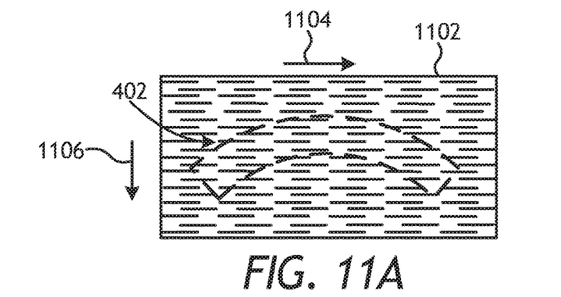
FIGS. 11A-11C depict another exemplary ferrite that may be machined out of a solid block of material.
Figure 11B:
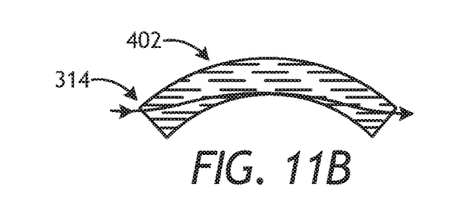
Figure 11C:
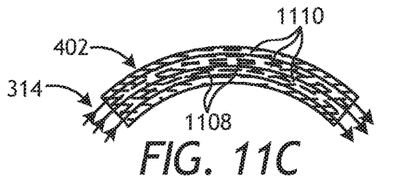

Referring now to FIGS. 11A-11C, illustrated is a ferrite 402 that may be machined out of a solid block of material 1102, according to one or more embodiments. The block of material 1102 may comprise a magnetic material that exhibits a known anisotropy. For example, the block of material 1102 may comprise an iron or ferrite powder that is pressed to form the block of material 1102 and that can later be machined to produce the ferrite 402. In at least one embodiment, the block of material 1102 may comprise FLUX-TROL® 100. In other embodiments, however, the block of material 1102 may comprise any magnetic material that can be processed to result in particle deformation favoring a particular direction, or with a process where the particles and/or magnetic domains may tend to orient themselves, or are intentionally oriented, in a particular direction (i.e., grain-oriented materials).

In pressing the ferrite material to form the block of material 1102, the iron/ferrite powder is deformed such that it is elongated in the plane 1104 normal to the press direction 1106, and also flattened, deformed, and/or shortened in the press direction 1106. Thus, the magnetic path thru the plane 1104 normal to the press may have fewer interfaces between particles. As a result, the magnetic permeability may be higher and more homogeneous and/or isotropic throughout the plane 1104 normal to the press, while there are more interfaces in the press direction 1106, which may lead to a lower relative permeability in that direction. FLUXTROL® 100, for example, exhibits a relative permeability of approximately 120 in the plane 1104 normal to the press while it is only about 80 in the press direction 1106. As will be appreciated, this can create complicated non-homogeneity for complex ferrite geometries, such as the ferrites 402 of FIG. 4B.

In FIG. 11B, the ferrite 402 has been excised from the block of material 1102 in the general form of a curve. The ferrite 402 may be formed out of the block of material 1102 using any manufacturing technique including, but not limited to, laser cutting, water jetting, milling, machining, and any combination thereof. As will be appreciated, the curved geometry of the ferrite 402 may result in adverse effects on the direction and/or distribution of the magnetic field 314 proceeding through the ferrite 402.

In FIG. 11C, to improve the direction of the magnetic field 314 through the ferrite 402, one or more laminations 1108 (two shown) may be positioned between adjacent layers 1110 of the ferrite 402. Similar to the laminations 1106 of FIG. 10, the laminations 1110 may be made of any non-magnetic, electrically insulating/non-conductive material such as, but not limited to, a polymer (e.g., polyimide), a rubber (e.g., RTV silicone), an elastomer, a ceramic, an epoxy, and any combination thereof.

The laminated ferrite 402 of FIG. 11 may be fabricated by machining thin ferrite strips 1110 out of the block of material 1102 that are then stacked and/or laminated with one or more laminations 1108. The ferrite strips 1008 each exhibit a decreased thickness, which effectively reduces the dimension in which the magnetic field 314 can deviate from the intended direction along the length 502. Moreover, since the laminations 1108 are non-magnetic, the laminations 1108 may exhibit a relative permeability of approximately 1 and may otherwise be equivalent to air-gapping the ferrite 402 at one or more depths. As a result, the magnetic flux lines of the magnetic field 314 may be constrained within the laminated areas and otherwise proceed more uniformly along the ferrite 402 between the laminations 1108. Accordingly, the laminated ferrite 402 may be fabricated to the original thickness, but with improved control of the magnetic field 314 by incorporating the laminations 1108. This may prove advantageous in providing more control over the magnetic field direction, distribution, and/or angle 316 (FIG. 3B).

Figure 12A:
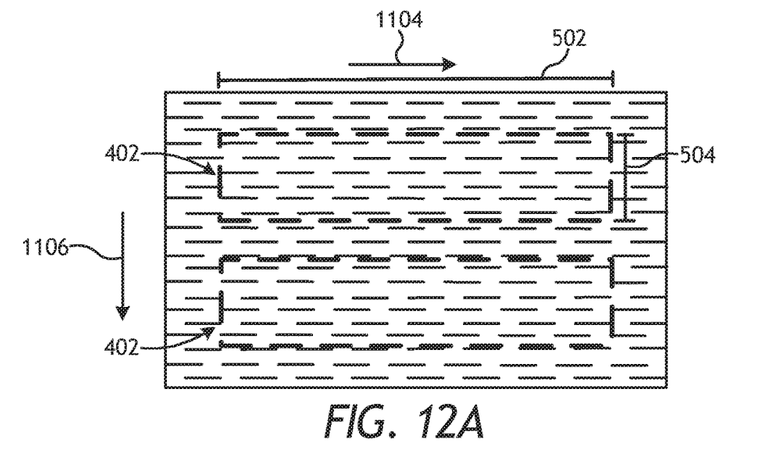
FIGS. 12A and 12B depict two exemplary ferrites that may be machined out of the solid block of material of FIG. 11A.
Figure 12B:
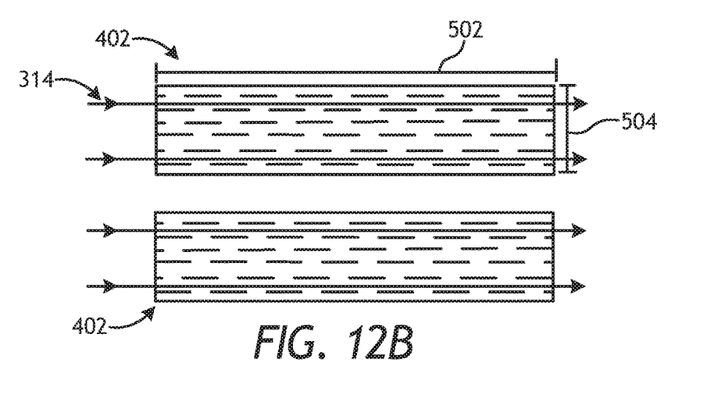

Referring now to FIGS. 12A and 12B, with continued reference to FIGS. 11A-11C, illustrated are two exemplary ferrites 402 that may be machined out of the solid block of material 1102, according to one or more embodiments. The anisotropy due to the lower permeability in the plane 1104 normal to the press may be used advantageously to guide the magnetic field 314 in a desired direction. In one or more embodiments, for instance, the ferrites 402 may be machined out of the block of material 1102 with the length 502 aligned with the plane 1104 normal to the press. In such embodiments, lower permeability may be exhibited in the press direction 1106 (i.e., along the width 405 of the ferrites 402), which may discourage the magnetic field 314 from traveling in the press direction 1106. In other words, a grain direction may be generated in the ferrites 402 to complement the dividers 412 (FIG. 4A) of the bobbin 302 (FIG. 4A), which may already serve to air-gap and guide the magnetic field 314 the desired direction/angle and/or distribution.

Embodiments disclosed herein include:

A. A method of fabricating a ferrite for use in a resistivity logging tool includes mixing a ferrite powder with a binder to provide a mixture, pressing the mixture into a mold to form the ferrite, wherein the mold exhibits a specific geometry corresponding to a channel defined on an inner surface of a bobbin associated with the resistivity logging tool, and wherein the channel is arcuate and extends at an angle offset from a central axis of the bobbin, and adjusting at least one of a length, a width, and a thickness of the ferrite to manipulate a magnetic permeability of the ferrite in a direction of a magnetic field passing through the ferrite.

B. A resistivity logging tool that includes a tool mandrel, a bobbin positioned about the tool mandrel and having a cylindrical body that provides an inner surface and an outer surface, wherein a plurality of channels are defined on the inner surface and laterally adjacent channels are separated by a divider extending radially inward from the inner surface, a coil winding wrapped about the outer surface of the body at an angle offset from a central axis of the body, and a plurality of ferrites received within the plurality of channels and interposing the coil winding and the tool mandrel, wherein the dividers prevent physical contact between laterally adjacent ferrites and each ferrite conforms to a geometry of a corresponding one of the plurality of channels, and wherein at least one of a length, a width, and a thickness of each ferrite is adjusted to manipulate a magnetic permeability of each ferrite in a direction of a magnetic field passing through the ferrite.

C. A method of fabricating a ferrite for use in a resistivity logging tool that includes providing a block of magnetic material that exhibits an isotropic magnetic permeability, and excising the ferrite from the block of magnetic material such that the ferrite exhibits a geometry corresponding to a channel defined on an inner surface of a bobbin associated with the resistivity logging tool, and wherein the channel is arcuate and extends at an angle offset from a central axis of the bobbin.

Each of embodiments A, B, and C may have one or more of the following additional elements in any combination: Element 1: wherein the binder is a material selected from the group consisting of a rubber, an elastomer, an epoxy, a polymer, and a ceramic. Element 2: wherein mixing the ferrite powder with the binder comprises rolling the ferrite powder and the binder between adjacent rollers. Element 3: wherein adjusting the at least one of the length, the width, and the thickness of the ferrite comprises increasing an aspect ratio between the length and the width and thereby increasing the magnetic permeability of the ferrite in the direction of the magnetic field passing through the ferrite. Element 4: wherein increasing an aspect ratio between the length and the width comprises at least one of decreasing the width of the ferrite and increasing the length of the ferrite. Element 5: wherein adjusting the at least one of the length, the width, and the thickness of the ferrite comprises increasing an aspect ratio between the length and the thickness and thereby increasing the magnetic permeability of the ferrite in the direction of the magnetic field passing through the ferrite. Element 6: wherein increasing an aspect ratio between the length and the thickness comprises at least one of decreasing the thickness of the ferrite and increasing the length of the ferrite. Element 7: wherein adjusting the at least one of the length, the width, and the thickness of the ferrite comprises positioning at least one lamination between adjacent layers of the ferrite along the length of the ferrite, the at least one lamination being made of a non-magnetic material. Element 8: wherein the non-magnetic material is selected from the group consisting of a polymer, a rubber, an elastomer, an epoxy, a ceramic, and any combination thereof. Element 9: wherein the adjacent layers of the ferrite each exhibit a decreased thickness as compared to the thickness of the ferrite, the method further comprising constraining the magnetic field passing through the ferrite to the decreased thickness of the adjacent layers of the ferrite.

Element 10: wherein the bobbin and the divider each comprise a material selected from the group consisting of a plastic, a thermoplastic, an epoxy, a polymer, a ceramic, and any combination thereof. Element 11: wherein each ferrite is a molded ferrite formed by mixing a ferrite powder with a binder to provide a mixture that is pressed into a mold that exhibits the geometry of the corresponding one of the plurality of channels. Element 12: wherein the binder is a material selected from the group consisting of a rubber, an elastomer, an epoxy, a polymer, a ceramic, and any combination thereof. Element 13: wherein an aspect ratio between the length and the width of at least one of the plurality of ferrites is increased to increase the magnetic permeability in the direction of the magnetic field passing through the at least one of the plurality of ferrites. Element 14: wherein an aspect ratio between the length and the thickness of at least one of the plurality of ferrites is increased to increase the magnetic permeability in the direction of the magnetic field passing through the at least one of the plurality of ferrites. Element 15: further comprising at least one lamination positioned between adjacent layers of at least one of the plurality of ferrites along the length of the at least one of the plurality of ferrites. Element 16: wherein the at least one lamination comprises a non-magnetic material selected from the group consisting of a polymer, a rubber, an elastomer, an epoxy, a ceramic, and any combination thereof. Element 17: wherein an aspect ratio between the length and the width of the laterally adjacent ferrites is decreased to reduce a difference in the magnetic permeability between each adjacent ferrite in the direction of the magnetic field passing through each adjacent ferrite.

Element 18: wherein providing the block of magnetic material comprises pressing a ferrite powder through a press to generate the block of magnetic material, and wherein the magnetic permeability is isotropic in a plane normal to a direction of the press. Element 19: wherein excising the ferrite from the block of magnetic material comprises excising the ferrite with a length of the ferrite aligned with the plane normal to the direction of the press. Element 20: further comprising positioning at least one lamination between adjacent layers of the ferrite along a length of the ferrite, the at least one lamination being made of a non-magnetic material selected from the group consisting of a polymer, a rubber, an elastomer, an epoxy, a ceramic, and any combination thereof.

By way of non-limiting example, exemplary combinations applicable to A, B, and C include: Element 5 with Element 6; Element 7 with Element 8; Element 7 with Element 9; Element 11 with Element 12; Element 15 with Element 16; and Element 18 with Element 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A resistivity logging tool, comprising:
   a tool mandrel;
   a bobbin positioned about the tool mandrel and having a cylindrical body that provides an inner surface and an outer surface, wherein a plurality of channels are defined on the inner surface and laterally adjacent channels are separated by a divider extending radially inward from the inner surface;
   a coil winding wrapped about the outer surface of the body at an angle offset from a central axis of the body; and
   a plurality of ferrites received within the plurality of channels and interposing the coil winding and the tool mandrel, wherein the dividers prevent physical contact between laterally adjacent ferrites and each ferrite conforms to a geometry of a corresponding one of the plurality of channels, and
   wherein at least one of a length, a width, and a thickness of each ferrite is adjusted to manipulate a magnetic permeability of each ferrite in a direction of a magnetic field passing through the ferrite.

2. The resistivity logging tool of claim 1, wherein the bobbin and the divider each comprise a material selected from the group consisting of a plastic, a thermoplastic, an epoxy, a polymer, a ceramic, and any combination thereof.

3. The resistivity logging tool of claim 1, wherein each ferrite is a molded ferrite formed by mixing a ferrite powder with a binder to provide a mixture that is pressed into a mold that exhibits the geometry of the corresponding one of the plurality of channels.

4. The resistivity logging tool of claim 3, wherein the binder is a material selected from the group consisting of a rubber, an elastomer, an epoxy, a polymer, a ceramic, and any combination thereof.

5. The resistivity logging tool of claim 1, wherein an aspect ratio between the length and the width of at least one of the plurality of ferrites is increased to increase the magnetic permeability in the direction of the magnetic field passing through the at least one of the plurality of ferrites.

6. The resistivity logging tool of claim 1, wherein an aspect ratio between the length and the thickness of at least one of the plurality of ferrites is increased to increase the magnetic permeability in the direction of the magnetic field passing through the at least one of the plurality of ferrites.

7. The resistivity logging tool of claim 1, further comprising at least one lamination positioned between adjacent layers of at least one of the plurality of ferrites along the length of the at least one of the plurality of ferrites.

8. The resistivity logging tool of claim 7, wherein the at least one lamination comprises a non-magnetic material selected from the group consisting of a polymer, a rubber, an elastomer, an epoxy, a ceramic, and any combination thereof.

9. The resistivity logging tool of claim 1, wherein an aspect ratio between the length and the width of the laterally adjacent ferrites is decreased to reduce a difference in the magnetic permeability between each adjacent ferrite in the direction of the magnetic field passing through each adjacent ferrite.

10. A resistivity logging tool, comprising:
    a tool mandrel;
    a bobbin positioned about the tool mandrel and having a cylindrical body that provides an inner surface and an outer surface, wherein a plurality of grooves are formed in the outer surface, wherein a plurality of channels are defined on the inner surface and laterally adjacent channels are separated by a divider extending radially inward from the inner surface;
    a coil winding wrapped about the outer surface of the body, wherein the coil winding is received in the plurality of grooves in the outer surface of the body;
    a plurality of ferrites received within the plurality of channels and interposing the coil winding and the tool mandrel, wherein the dividers prevent physical contact between laterally adjacent ferrites and each ferrite is received in a corresponding one of the plurality of channels, wherein each ferrite comprises a ferrite powder and a binder to provide a mixture that is pressed into a mold that exhibits the geometry of the corresponding one of the plurality of channels;
    wherein at least one of a length, a width, and a thickness of each ferrite is selected to enhance a magnetic permeability of each ferrite in a direction of a magnetic field passing through the ferrite.

11. The resistivity logging tool of claim 10, wherein the coil winding is wrapped at an angle offset from a central axis of the body, and wherein the plurality of channels are generally orthogonal to the plurality to the grooves.

12. The resistivity logging tool of claim 10, the binder comprises at least one material selected from the group consisting of a cured rubber, a cured elastomer, a ceramic, a polymer, and an epoxy.

13. The resistivity logging tool of claim 10, wherein an aspect ratio between the length and the width of at least one of the plurality of ferrites is selected to increase the magnetic permeability in the direction of the magnetic field passing through the at least one of the plurality of ferrites with respect to other ferrites with a smaller aspect ratio.

14. The resistivity logging tool of claim 10, wherein an aspect ratio between the length and the thickness of at least one of the plurality of ferrites is selected to increase the magnetic permeability in the direction of the magnetic field passing through the at least one of the plurality of ferrites with respect to other ferrites with a smaller aspect ratio.

15. The resistivity logging tool of claim 10, further comprising at least one lamination positioned between adjacent layers of at least one of the plurality of ferrites along the length of the at least one of the plurality of ferrites.

16. The resistivity logging tool of claim 15, wherein the at least one lamination comprises a non-magnetic material selected from the group consisting of a polymer, a rubber, an elastomer, an epoxy, a ceramic, and any combination thereof.

17. The resistivity logging tool of claim 10, wherein the bobbin and the divider each comprise a material selected from the group consisting of a plastic, a thermoplastic, an epoxy, a polymer, a ceramic, and any combination thereof.

18. The resistivity logging tool of claim 10, wherein the binder is a material selected from the group consisting of a rubber, an elastomer, an epoxy, a polymer, a ceramic, and any combination thereof.

19. The resistivity logging tool of claim 10, wherein each ferrite is a molded ferrite formed by mixing a ferrite powder with a binder to provide a mixture that is pressed into a mold that exhibits the geometry of the corresponding one of the plurality of channels.

20. The resistivity logging tool of claim 10, wherein an aspect ratio between the length and the width of the laterally adjacent ferrites is decreased to reduce a difference in the magnetic permeability between each adjacent ferrite in the direction of the magnetic field passing through each adjacent ferrite.

* * * * *